US010286706B2

(12) United States Patent
Rueger et al.

(10) Patent No.: US 10,286,706 B2
(45) Date of Patent: May 14, 2019

(54) LASER-MARKABLE AND LASER-WELDABLE POLYMERIC MATERIALS

(71) Applicant: Merck Patent GmbH, Darmstadt (DE)

(72) Inventors: Reinhold Rueger, Roedermark (DE); Ulrich Quittmann, Floersheim (DE); Silvia Rosenberger, Bodenheim (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 15/536,146

(22) PCT Filed: Nov. 18, 2015

(86) PCT No.: PCT/EP2015/002307
§ 371 (c)(1),
(2) Date: Jun. 15, 2017

(87) PCT Pub. No.: WO2016/096072
PCT Pub. Date: Jun. 23, 2016

(65) Prior Publication Data
US 2017/0355210 A1 Dec. 14, 2017

(30) Foreign Application Priority Data
Dec. 17, 2014 (DE) .................. 10 2014 018 586

(51) Int. Cl.
*C08K 3/30* (2006.01)
*B41M 5/26* (2006.01)
*C01G 9/08* (2006.01)
*C08K 9/02* (2006.01)

(52) U.S. Cl.
CPC .............. *B41M 5/267* (2013.01); *C01G 9/08* (2013.01); *C08K 9/02* (2013.01); *C01P 2002/54* (2013.01); *C01P 2004/61* (2013.01); *C01P 2004/62* (2013.01); *C01P 2006/12* (2013.01); *C08K 2003/3036* (2013.01)

(58) Field of Classification Search
CPC . B41M 5/267; B23B 5/16; C08K 3/30; C08K 2003/3036
USPC .............. 523/515; 524/420; 428/403, 195.1; 252/518, 301.4
See application file for complete search history.

(56) References Cited

U.S. PATENT DOCUMENTS

| | | | |
|---|---|---|---|
| 5,131,952 A | 7/1992 | Hayashi | |
| 8,383,712 B2 * | 2/2013 | David | C08K 3/30 524/301 |
| 9,127,165 B2 * | 9/2015 | Gruner | C09D 5/1618 |
| 2003/0234286 A1 | 12/2003 | Labrec et al. | |
| 2004/0198858 A1 * | 10/2004 | Labrec | B41M 5/24 522/2 |
| 2004/0229022 A1 * | 11/2004 | Bourdelais | B42D 25/00 428/195.1 |
| 2005/0095408 A1 | 5/2005 | Labrec | |
| 2005/0120917 A1 * | 6/2005 | Ruger | C09C 1/0015 106/415 |
| 2010/0063164 A1 | 3/2010 | Amirzadeh-Asl | |
| 2010/0181754 A1 * | 7/2010 | Labrec | B41M 5/24 283/95 |
| 2012/0010345 A1 | 1/2012 | Edler | |
| 2012/0298933 A1 | 11/2012 | Gelissen | |

FOREIGN PATENT DOCUMENTS

| | | |
|---|---|---|
| CN | 1316421 C | 5/2007 |
| CN | 102356131 A | 2/2012 |
| CN | 102597081 A | 7/2012 |
| DE | 3929056 A1 | 3/1991 |
| EP | 0415477 A2 | 3/1991 |
| WO | 2008065208 A1 | 6/2008 |

OTHER PUBLICATIONS

Que et al. "Photoluminescence and electroluminescence from copper doped zinc sulphide nanocrystals/polymer composite" Applied Physics Letters, vol. 73, No. 19, 2727-2729. published Sep. 1998 (Year: 1998).*
International search report in WO2016096072 dated Jun. 23, 2016 to Rueger Reinhold of Merck Patent GMBH.
Search report in corresponding China application 2015-0068673.3 dated Aug. 6, 2018 (pp. 1-11).

* cited by examiner

*Primary Examiner* — Jane L Stanley
(74) *Attorney, Agent, or Firm* — Millen White Zelano and Branigan, PC; Csaba Henter

(57) ABSTRACT

The present invention relates to laser-markable and laser-weldable polymeric materials which are distinguished by the fact that they comprise, as laser absorber, at least one copper-doped zinc sulfide.

20 Claims, No Drawings

LASER-MARKABLE AND LASER-WELDABLE POLYMERIC MATERIALS

The present invention relates to laser-markable and laser-weldable polymeric materials which are distinguished by the fact that they comprise, as absorber, at least one copper-doped zinc sulfide.

The labelling of manufactured goods is becoming increasingly important in virtually all branches of industry. Thus, for example, dates of manufacture, batch numbers, expiry dates, barcodes, 2D codes, company logos and serial numbers frequently have to be applied to plastic parts. Of increasing importance in this connection is contactless, very rapid and flexible marking using lasers. Using this technology it is possible to apply inscriptions at high spee, even to a non-planar surface. Since the inscription is located within the plastic body itself, it is permanently resistant to abrasion.

Since many plastics are transparent to laser light, laser-sensitive agents which, as a result of absorption of the laser energy in the plastic material either directly as a result of interaction with the polymer or indirectly with the added material, cause a local, highly visible discoloration, are usually added to the plastics. The laser-sensitive agent can be an organic dye or a pigment which absorbs the laser light. Various causes may be given for the discoloration, for example, the decomposition of the polymer or the absorber itself is converted from an invisible form to a visible form. A darkening in the colour of the plastic generally occurs due to carbonisation as a consequence of the laser energy introduced.

Numerous additives are known for the laser marking of plastics. Suitable materials for marking using Nd-YAG lasers (neodymium-doped yttrium aluminium garnet lasers), $YVO_4$ lasers (yttrium vanadate lasers) and 1064 nm fibre lasers are preferably those which absorb light of wavelength 1064 nm and themselves have only a slight intrinsic colour. Examples are copper phosphates, bismuth oxide, bismuth oxychloride, antimony-doped tin oxide on mica or metals. EP 1 377 522 A2 describes additives for the laser marking of plastics which consist of a calcined antimony/tin mixed oxide in which the antimony concentration at the surface is greater than that in the particles as a whole. The particle size is 0.1-10 µm, preferably 0.5-5 µm. With the additive, dark laser markings are obtained in the majority of polymers. These are suitable, for example, for the marking of pale plastics. Pale markings, as are generally required for the marking of dark plastics, are not obtained with this laser additive.

It is disadvantageous that dark laser markings are only discernible with great difficulty on coloured or darkly coloured plastic parts. Examples of dark or coloured plastic parts are cable insulations, keyboards or darkly coloured plastic pipes. A pale, as far as possible white, inscription is desired here since this appears significantly higher in contrast than a grey or black marking against the dark background. Pale markings can be produced by foaming plastics by means of laser irradiation. However, this is limited to a few polymer types and leads to a considerable change in the surface as a result of the foam formation. The mechanical strength of the surface is thereby reduced.

WO 2011/085779 A1 discloses materials and a process for the production of a pale laser marking. Particles are employed here which consist of a white core and a preferably black or grey shell, where the latter can be decoloured by laser irradiation. The dark shell contains carbon, for example in the form of carbon black. The materials described in WO 2011/085779 A1 all have the disadvantage that they are dark grey to black and therefore considerably restrict the colour design of the plastic parts. In particular, red, blue and green shades are only feasible to a limited extent, if at all.

There therefore continues to be a need for laser additives which lead, particularly on coloured or dark substrates as a result of laser bombardment, to a pale to white marking which is durable and is retained over a long period, even under mechanical stress.

It is therefore an object of the present invention to find a process for the production of high-contrast and mechanically stable pale markings on plastic articles, preferably coloured or dark plastic objects. A further object of the invention consists in providing an additive for laser marking which has only a slight intrinsic colour, or none at all, which, under the action of laser light, produces very good marking results in the polymer doped therewith, in particular high-contrast and sharp pale markings, preferably on a coloured or dark background and can be used in a broad range of plastics.

It is a further object of the present invention to provide a process for the preparation of such a laser additive.

Surprisingly, it has been found that coloured plastic articles and polymer layers can be provided with a pale marking by laser bombardment if the plastic or polymer comprises copper-doped zinc sulfide.

The invention therefore relates to laser-markable and/or laser-weldable polymers, characterised in that they comprise, as absorber, at least one copper-doped zinc sulfide.

Of particular importance for the action of the doped zinc sulfide as laser additive for a pale laser marking is the doping of the zinc sulfide with copper. The content of copper in the zinc sulfide in the present invention is preferably 0.5-15 mol % of Cu, in particular 1-6 mol %, based on the sum of zinc sulfide and copper sulfide.

Furthermore, the specific surface area of the Cu-doped zinc sulfide may also influence the marking result. The BET surface area of the zinc sulfide is preferably >5 $m^2/g$, in particular >7 $m^2/g$. The BET surface area is determined by measurement of the nitrogen absorption by the Brunnauer, Emmett and Teller method in accordance with DIN ISO 9277:2003-05.

Furthermore, the particle size of the zinc sulfide may also influence the marking result. High-contrast pale markings with high edge sharpness are preferably obtained if the particle size of the particles is 20-1000 nm, in particular 50-500 nm. Particular preference is given to particle sizes of 80-400 nm. The particle size is determined in this application by means of laser diffraction (Malvern).

Copper sulfide-coated zinc sulfide is known, for example, from DE 39 29 056 A1. This patent application discloses electrically conductive powders which consist of zinc sulfide which has been coated with copper sulfide. The electrically conductive powders from DE 39 29 056 A1 having a particle size of 0.3-5 µm consist of zinc sulfide in the core and have pigment quality, i.e. a purity of at least 97%. Due to the zinc sulfide core, the virtually black colour of the copper sulfide is lightened to a pale olive green. The proportion by weight of copper sulfide in the electrically conductive powder is 2 to 30% by weight, where a proportion of 6 to 18% by weight is preferred. Only in this range are relatively pale pigments having adequate electrical conductivity obtained. Furthermore, copper-doped zinc sulfides having low copper contents of less than 1 mol % of Cu, based on zinc sulfide, and relatively large particles (>1 µm, preferably >10 µm) are known as green phosphors (phosphorescence, electroluminescence). Finely divided zinc sulfide luminophores with copper doping are described, for example, in DE 19953924 A1 and the prior art cited therein.

Essential features for the suitability of the zinc sulfide pigments according to the invention are the low inherent colour and the low hiding power in plastics applications. In order to obtain pale markings with high edge sharpness, it is frequently additionally advantageous if the specific surface area of the copper-containing zinc sulfide pigments is 5 m$^2$/g (BET) or more, preferably 7-40 m$^2$/g. Pigments having specific surface areas of 7 m$^2$/g or more exhibit higher transparency in use than those having a lower specific surface area.

The starting material used can be all zinc sulfides known to the person skilled in the art. Zinc sulfide is commercially available, inter alia with the trade name Sachtolite from Sachtleben.

Particularly preferred starting materials are transparent finely divided zinc sulfides, i.e. zinc sulfide particles having a $D_{50}$<1000 nm, for example known from WO 2008/065208 A1. These can be modified with copper sulfide either directly during preparation or also in a separate processing step.

Besides the excellent optical properties, contrast and edge sharpness, the copper-doped zinc sulfide enables rapid markings with high pulse rates and has a large process window, based on the laser setting parameters. In addition, the brightness of the marking can be intentionally controlled as far as dark markings by adjustment of the laser parameters. Detail-rich half-tone images are accessible merely via control of the laser parameters. The invention likewise relates to the method for image generation.

The copper content of the pigments is preferably 0.5-15 mol %, based on the sum of copper sulfide and zinc sulfide, in particular 2-10 mol %. In contrast to the case of the conductive pigments from DE 39 29 056 A1, it is not necessary for there to be a continuous outer coating of copper sulfide on the zinc sulfide particles. Instead, a lower content of copper sulfide is already sufficient in the case of the pigments according to the invention for pale laser marking in order to facilitate adequate absorption of the laser light. For this reason, very finely divided zinc sulfides ($D_{50}$≤1000 nm) having low copper contents can also be employed, which is not possible in the case of the electrically conductive materials without loss of the conductivity. Owing to the low copper contents necessary, significantly paler pigments are also feasible. Preference is given to copper sulfide contents of less than 10 mol %, in particular 5 mol %.

The copper sulfide content in the pigment may optionally also be homogeneously distributed over the pigment particle or located in layer form below the surface of the pigment particles. For example, the particles can also be provided with a further zinc sulfide layer after the copper sulfide coating. The colour can thus be lightened further. An organic post-coating is also possible. The organic post-coating is preferably a coating with one or more monomeric or oligomeric organosilane, as described, for example, in WO 2004/092284 A1. As an alternative to the silanes, coatings with higher carboxylic acids, for example stearic acids, are also suitable.

Besides support-free zinc sulfide, finely divided inorganic support materials coated with zinc sulfide, for example barium sulfate coated with zinc sulfide, can also be doped with copper, where the doping relates to the zinc sulfide coating. The support materials preferably have particle sizes of 20-1000 nm, in particular 50-500 nm and very particularly preferably particle sizes of 80-400 nm. Suitable support materials are likewise available in pigment quality, for example under the tradename Lithopone 30 L or Lithopone 60 L from Sachtleben. The zinc sulfide content in these pigments is 30% by weight or 60% by weight respectively, based on the pigments. The copper content in the zinc sulfide in this embodiment with copper-doped zinc sulfide on a substrate is preferably 1-30 mol % of Cu, in particular 2-10 mol %, based on the sum of zinc sulfide and copper sulfide.

The preparation of the pigments according to the invention is relatively simple. For the reaction, use is made of the different solubilities of zinc sulfide and copper sulfide (solubility products: $K_{sp}$ (ZnS)=21.7; $K_{sp}$ (CuS)=40.2). Copper sulfide is deposited on the zinc sulfide by ion exchange. Accordingly, the process for the preparation of the zinc sulfide pigments according to the invention preferably consists in that an aqueous solution or suspension of a copper salt having a pH of 3 to 11 and zinc sulfide particles are combined with vigorous stirring, and the zinc sulfide particles provided with copper sulfide by the reprecipitation are separated off and worked up.

In a preferred embodiment, the starting material can be zinc sulfide in pigment quality, which already has chemical purity. Such pigments are commercially available, for example under the trade name Sachtolite from Sachtleben. A soluble copper salt is added to an aqueous suspension thereof, causing the less-soluble copper sulfide to be deposited and the more readily soluble zinc ions to dissolve. The product obtained is filtered off, washed, dried and subsequently powdered. The product may optionally also be converted into a preparation, for example into a mixture with an inert diluent, such as Aerosil, talc, MgO or silica gel, or into a master-batch with a plastic.

The copper salts employed which are more readily soluble in the reaction medium than copper sulfide are advantageously copper(II) salts. In particular, copper(II) salts of mineral acids, for example the nitrates, chlorides, sulfates thereof, are suitable. Copper(II) sulfate is preferably employed. However, copper(I) compounds can also be employed, for example CuCl.

It is not critical for the process whether the zinc sulfide is introduced into the aqueous solution of the copper salt as such or as an aqueous suspension, or whether an aqueous solution of copper salt is introduced into a zinc sulfide suspension.

The temperature maintained for the process of the invention is preferably in the range 20-100° C.; however, working at elevated (>40° C.) temperature considerably accelerates the reaction rate. In order to achieve a uniform, strongly adherent coating, the reaction is preferably begun at room temperature and the reaction mixture is increased to 50-80° C. during the remainder of the reaction.

In order to prevent dissolution of the zinc sulfide by bases or acids and where appropriate the liberation of hydrogen sulfide, the pH of the reaction medium is preferably set in the range 3-11.

However, the copper sulfide may also be co-precipitated or applied as early as during preparation of the zinc sulfide, so that copper-doped zinc sulfide is obtained directly and the subsequent reaction is superfluous.

The combination of copper sulfide and zinc sulfide has an advantageous effect in a number of respects. The copper sulfide present causes significant absorption of the laser light, even in the case of very small particles. The pigments are thus effective as additive for laser marking, even in very low concentration. The high specific surface area favours the formation of a pale marking. Owing to the low copper sulfide contents, the lattice structure of the zinc sulfide is retained and the favourable applicational properties of the zinc sulfide pigments, such as, for example, narrow particle-size distribution, good dispersibility, low abrasiveness, brightness and transparency, are thus also retained. It is furthermore advantageous that the final laser additive is very inexpensive, both regarding the starting materials and also in the preparation.

In addition, disadvantages, as are frequently observed in the case of known copper compounds, such as, for example, copper pyrophosphate or copper hydroxide phosphate, during processing in plastics, for example degradation of the plastic, dark colouration of the plastic articles under the action of ammonia or hydrogen sulfide or the copper coating of the metal tools in the compounders and extruders, do not occur in the case of the laser additives according to the invention.

The introduction of the laser additive into the plastic or polymer can be carried out analogously to usual the processes in industry, for example as dry pigment mixture, as liquid preparation or paste or via a plastic- or wax-based concentration, a so-called masterbatch. The introduction of the laser-active pigments via extrusion of a compound is also possible. This differs from the masterbatch in that it is employed without further dilution in the following processing, since it already contains the desired additives in the final concentration in the desired plastic. Besides the laser-active pigments, it is also possible for colouring pigments and further additives to be added during all said additive-addition processes.

In the advantageous embodiment, a masterbatch of the plastic having a relatively high concentration of the copper-doped zinc sulfide is firstly prepared and this is then added in a small amount as granules to the main composition of the plastic during processing of the plastic.

Furthermore, colorants may be added to the polymers, allowing a broad colour variation, particularly in the colours red, green and blue. Suitable colorants are in particular organic pigments and dyes.

Suitable polymeric materials which can be used for laser marking are, in particular, all known plastics, in particular thermoplastics, furthermore thermosets and elastomers, as described, for example, in Ullmann, Vol. 15, p. 457 ff., Verlag VCH. Suitable thermoplastic polymers are, for example, polyethylene, polypropylene, polyamides, polyesters, polyether esters, polyphenylene ethers, polyacetal, polybutylene terephthalate (PBT), polyethylene terephthalate (PET), polymethyl methacrylate, polyvinyl acetal, polystyrene, acrylonitrile-butadiene-styrene (ABS), acrylonitrile-styrene-acrylate (ASA), styrene-acrylonitrile (SAN), polycarbonate, polyether sulfones and polyether ketones, and their copolymers, mixtures, and/or polymer blends, such as, for example, PC/ABS, MABS.

Suitable thermosetting polymers are, for example, polyurethane, melamine resins, polyesters and epoxy resins.

The incorporation of the copper-doped zinc sulfide can take place, for example, by compounding, via a masterbatch, via pastes or by direct addition during the shaping processing step (direct pigmentation). Further additives, such as, for example, processing aids, stabilisers, flame retardants, fillers and colour-imparting pigments, can optionally be added to the polymer, preferably plastic granules, during the incorporation of the absorber. The laboratory preparation of the doped plastic granules is generally carried out by initially introducing the plastic granules in a suitable mixer, wetting them with dispersion aids and then adding and incorporating the absorber and the coloured pigments required. In industrial practice, the colouring of and addition of additives to the polymer is usually carried out via a colour concentrate (masterbatch) or compound. For this purpose, coloured pigments and additives are dispersed in the molten plastic with high shear in extruders (usually co-rotating twin-screw extruders). The plastic melt exits through a perforated plate on the extruder head and is converted into granules by means of suitable downstream devices (for example strand pelletising processes or underwater granulation). The granules thus obtained can be further processed directly in an extruder or injection moulding machine. The mouldings formed during the processing exhibit very homogeneous distribution of the absorber. Subsequently, the laser marking is carried out using a suitable laser.

In the case of coloured or dark laser-markable polymers or plastics, the polymer or plastic comprises one or more colorants besides the laser additive according to the invention. Without a colourant, the plastic is pale and transparent to opaque. Even without colorants, pale markings are obtained in the polymer in the presence of the laser additive according to the invention, but these are then only discernible with difficulty owing to the low contrast.

The concentration of the laser additive in the polymer, preferably thermoplastics, thermosets, elastomers, is generally dependent on the polymer material employed.

The use concentration of the copper-doped zinc sulfide for laser marking is preferably 0.01-1%, in particular 0.05-0.5%, based on the plastic or polymer. Owing to its low inherent colour and high transparency of the copper-doped zinc sulfide, the optical properties of the marked plastic or polymer are only impaired to a slight extent by the laser additive. The low content of laser additive changes the polymer system insignificantly and also does not influence its processability.

Under the action of laser light, the copper-doped zinc sulfide exhibits a pale marking with high contrast and pronounced edge sharpness in the polymer. The foaming which occurs in other processes for pale marking and the associated roughening of the surface is not observed.

The invention also relates to a process for the preparation of the doped polymeric materials according to the invention, characterised in that a polymeric material is mixed with the laser additive and then shaped under the action of heat.

Besides the excellent optical properties, contrast and edge sharpness, the laser additive according to the invention allows rapid marking with high pulse rates and provides a large processing window based on the laser settings. By adjusting the laser parameters it is moreover possible to control, in a targeted manner, the paleness of the marking ranging to dark markings. Merely by controlling the laser parameters, detail-rich half-tone images are accessible. The invention likewise relates to the process of generating images.

The inscription of the polymer using the laser is carried out by bringing the specimen into the ray path of a pulsed laser, preferably an Nd:YAG laser or fibre laser. Furthermore, inscription using an excimer laser, for example via a masking technique, is possible. However, the desired results can also be achieved using other conventional types of laser which have a wavelength in a region of high absorption of the pigment used. The marking obtained is determined by the irradiation time (or pulse count in the case of pulsed lasers) and irradiation power of the laser and also by the plastic system used. The power of the laser used depends on the particular application and can readily be determined by the person skilled in the art on a case by case basis.

The laser used generally has a wavelength in the range from 157 nm to 10.6 µm, preferably in the range from 532 nm to 10.6 μm. Mention may be made here, for example, of $CO_2$ lasers (10.6 μm) and Nd:YAG lasers (1064 or 532 nm) or pulsed UV lasers. The excimer lasers have the following wavelengths: $F_2$ excimer laser (157 nm), ArF excimer laser (193 nm), KrCl excimer laser (222 nm), KrF excimer laser (248 nm), XeCl excimer laser (308 nm), XeF excimer laser (351 nm), frequency-multiplied Nd:YAG lasers having wavelengths of 355 nm (frequency-tripled) or 265 nm (frequency-quadrupled). Particular preference is given to the use of Nd:YAG lasers (1064 or 532 nm). The energy densities of the lasers used are generally in the range from 0.3 $mJ/cm^2$ to 50 $J/cm^2$, preferably 0.3 $mJ/cm^2$ to 10 $J/cm^2$. When using pulsed lasers, the pulse frequency is generally in the range from 1 to 100 kHz. Corresponding lasers which can be used in the process according to the invention are commercially available.

The laser welding is carried out by welding a laser-transparent material to a laser-absorbing material. As laser-absorbing material, the copper-doped zinc sulfide can be added in concentrations of 0.001 to 10% by weight, preferably 0.001 to 7% by weight and in particular 0.01 to 3% by weight, based on the polymer. CW diode lasers or Nd:YAG lasers at wavelengths of 800-1100 nm, preferably 808-1080 nm, are preferably suitable for laser welding. The energy densities of the lasers used are generally in the range from 0.3 $mJ/cm^2$ to 200 $J/cm^2$, preferably 0.5 $J/cm^2$ to 150 $J/cm^2$.

The polymer doped in accordance with the invention can be used in all fields where conventional welding processes or printing processes have hitherto been used for the inscription or joining of plastics. For example, moulding compositions, semi-finished products and finished parts made from the polymer according to the invention can be used in the electrical, electronics and automotive industry. The labelling and inscription of, for example, cables, pipes, decorative strips or functional parts in the heating, ventilation and cooling sector or switches, plugs, levers and handles which consist of the polymer doped in accordance with the invention can be carried out with the aid of laser light even in places that are difficult to access. Furthermore, the polymer system according to the invention can be used in packaging in the food sector or in the toy sector. The markings on the packaging are distinguished by the fact that they are wipe- and scratch-resistant, stable during subsequent sterilisation processes, and can be applied in a hygienically pure manner during the marking process. Complete label images can be applied permanently to the packaging for a reusable system. Furthermore, the polymer system according to the invention is used in medical technology, for example in the marking von Petri dishes, microtitre plates, disposable syringes, ampoules, sample containers, supply tubes and medical collecting bags or storage bags.

A further important area of application for laser inscription are plastic tags for the individual labelling of animals, so-called cattle tags or ear marks, and of products, so-called security seals. A barcode system is used to store the information which specifically belongs to the animal. This can be read off as required with the aid of a scanner. The inscription must be very durable since the ear tags sometimes remain on the animals for a number of years.

The laser marking of moulding compositions, semi-finished products and finished parts which consist of the polymer according to the invention is thus possible.

The following examples are intended to explain the invention, but without limiting it. The percentages indicated are percent by weight. All particle sizes in this application are determined by means of laser diffraction (Malvern).

EXAMPLES

Example 1

50 g of zinc sulfide having a particle size of 0.3 μm ($D_{50}$) are suspended in 200 ml of water. 100 ml of a copper(II) sulfate solution which contains 6.4 g of $CuSO_4*5 H_2O$ and has been adjusted to pH 4 using acetic acid are added dropwise at room temperature with stirring. When the addition is complete, the suspension is warmed to 60° C. and stirred for a further 1 hour. The product is subsequently filtered off, washed with water and dried at 110° C. The grey-green product comprises 5 mol % of copper sulfide, based on the sum of zinc sulfide and copper sulfide.

1 kg of PP granules (Metocene 648T, Basell) is wetted with 2 g of dispersion aid (Process-Aid 24, Colormatrix) in a drum mixer. 5 g of the pigment from Example 1 and 1 g of organic green coloured pigment (PV Fast Green GG01, Clariant) are added and incorporated for 2 min in the drum mixer. The resulting mixture is compounded in a co-rotating twin-screw extruder with high shear at a jacket temperature of 250-260° C., extruded through a pelletising die, cooled in a water bath and granulated by means of a rotating blade. The compound obtained is dried at 100° C. for 1 h and converted into plates measuring 60 mm×90 mm×1.5 mm (W×H×D) in an injection moulding machine. The plastic plates are then laser-marked using a pulsed $YVO_4$ laser having a wavelength of 1064 nm and a maximum output power of 10.5 W. The test grid varies the speed between 500 and 5000 mm/s and the frequency between 20 and 100 kHz. Filled areas with a line spacing of 50 μm and also line text are lasered. Stable pale laser markings are obtained up to a speed of 3000 mm/s. The line marking is very defined with accurate detail and confirms the homogeneous distribution of the additive in the plastic.

Example 2

12.8 g of $CuSO_4 \times 5 H_2O$ are dissolved in 500 ml of $H_2O$, and the pH is adjusted to 4 using acetic acid. 50 g of talc Plustalc H05AW, Mondo Minerals, are stirred into the solution at room temperature with vigorous stirring, and 50 g of zinc sulfide powder (particle size: $D_{50}$=0.3 μm) are subsequently introduced with stirring. The suspension is stirred at room temperature for 30 minutes and at 60° C. for a further 60 minutes. After filtration and washing, the product is dried at 110° C. and finally very finely powdered ($D_{50} \leq 1000$ nm) in a planetary grinder. The proportion of copper sulfide is 10 mol %, based on the sum of copper sulfide and zinc sulfide. The colour of the powder is a pale olive green.

The pigment powder obtained is incorporated into polypropylene analogously to Example 1. The same starting weights and likewise the green coloured pigment are used. The laser treatment under the same conditions likewise gives stable pale laser markings up to a speed of 3000 mm/s. The line marking is very defined and accurately detailed and also confirms the homogeneous distribution of the laser additive in the plastic in Example 2.

Example 3

5.4 g of $CuSO_4*5 H_2O$ are dissolved in 500 ml of $H_2O$. 100 g of zinc sulfide powder (particle size: $D_{50}$=0.3 μm) are subsequently introduced at room temperature with stirring. A pH of 4.5 is set. The suspension is stirred at room temperature for 30 minutes and subsequently at 60° C. for a further 60 minutes. The solid is then filtered off, washed and dried at 110° C., giving a pale grey-green powder. The copper sulfide content is 2 mol %, based on the sum of zinc sulfide and copper sulfide.

The mixture is processed further analogously to Example 1 firstly to give a compound and subsequently to give small plates. The plates are subsequently laser-marked with the test grid corresponding to Example 1.

The pigment powder obtained is incorporated into polypropylene analogously to Example 1. The same starting weights and likewise the green coloured pigment are used. The laser treatment under the same conditions likewise gives stable pale laser markings up to a speed of 2000 mm/s. The line marking is very defined and accurately detailed and also confirms the homogeneous distribution of the laser additive in the plastic in Example 3.

Example 4 (Laser Welding)

In order to test the laser welding, plastic plates from Example 1 are used. The plates form, as laser-absorbent material, the underside of the element to be welded. The upper side consists of a laser-transparent plate of pure polypropylene (Metocene 648T, Basell). The laser-transparent plate like-wise has the dimensions 60 mm×90 mm×1.5 mm (W×H×T) and is produced on an injection-moulding machine under the same conditions as in Example 1. In order to test the weldability, the 1064 nm laser (Trumpf Vectormark 5, 10.5 W maximum output power) is again used, only this time in continuous (cw) mode, i.e. unpulsed. The laser beam here is set so that the focus is 4 mm below the surface of the lower laser-absorbent plate. The laser-transparent plate, which is additionally fixed at the edges by magnets, lies on the laser-absorbent plate which comprises the copper-doped ZnS. The maximum laser power (100%) is set. The speed of the laser beam is 200 mm/s. 1000 parallel lines having a length of 1 mm and a separation of 50 µm are lasered successively. With an advance of 10 mm/s, a weld seam with a width of 1 mm thus forms. The weld seam is produced cleanly and both parts are firmly connected.

The invention claimed is:

1. A laser-markable and/or laser-weldable polymer, comprising, as absorber, at least one copper-doped zinc sulfide,
   wherein the copper content in the zinc sulfide is 0.5-15 mol %, based on the sum of copper sulfide and zinc sulfide,
   wherein the copper-doped zinc sulfide is present at a concentration of 0.01 to 1% by weight, based on the polymer, and
   wherein the copper-doped zinc sulfide is not electrically conductive.

2. The laser-markable and/or laser-weldable polymer according to claim 1, wherein the copper content in the zinc sulfide is 1-6 mol %, based on the sum of copper sulfide and zinc sulfide.

3. The laser-markable and/or laser-weldable polymer according to claim 1, wherein the copper-doped zinc sulfide has a particle size of 20-1000 nm.

4. The laser-markable and/or laser-weldable polymer according to claim 1, wherein the copper-doped zinc sulfide is applied to an inorganic support.

5. The laser-markable and/or laser-weldable polymer according to claim 1, wherein the copper-doped zinc sulfide is additionally provided on the surface of the copper-doped zinc sulfide with a zinc sulfide layer.

6. The laser-markable and/or laser-weldable polymer according to claim 1, wherein the copper-doped zinc sulfide additionally has an organic post-coating.

7. The laser-markable and/or laser-weldable polymer according to claim 1, wherein the copper-doped zinc sulfide is present at a concentration of 0.05-0.5% by weight, based on the polymer.

8. The laser-markable and/or laser-weldable polymer according to claim 1, wherein the polymer is a thermoplastic, thermoset or elastomer.

9. The laser-markable and/or laser-weldable polymer according to claim 1, wherein the polymer additionally comprises one or more coloured pigments and/or dyes.

10. A process for preparing the laser-markable and/or laser-weldable polymer according to claim 1, comprising adding the copper-doped zinc sulfide simultaneously or successively by compounding, via a masterbatch or via a paste or by direct addition to the polymer, and optionally adding one or more additives and the polymer is then shaped under the action of heat.

11. A method for the production of a moulding composition, semi-finished product finished part, comprising incorporating the laser-markable and/or laser-weldable polymer according to claim 1 into the composition, product or part.

12. A moulding composition, semi-finished product or finished part, consisting of the laser-markable and/or laser-weldable polymer according to claim 1.

13. The laser-markable and/or laser-weldable polymer according to claim 1, wherein the copper-doped zinc sulfide is grey-green.

14. The laser-markable and/or laser-weldable polymer according to claim 1, which is capable of forming pale to white markings upon laser bombardment.

15. The laser-markable and/or laser-weldable polymer according to claim 1, wherein the copper sulfide content in the copper-doped zinc sulfide in the form of particles is homogeneously distributed over the copper-doped zinc sulfide particles or located in a layer form below the surface of the copper-doped zinc sulfide particles.

16. A method for image generation, comprising forming an image on the laser-markable and/or laser-weldable polymer according to claim 1 by a laser.

17. The method for image generation according to claim 16, wherein a pale to white marking is formed upon laser bombardment of the laser-markable and/or laser-weldable polymer.

18. A copper-doped zinc sulfide, comprising 0.5-15 mol % of copper, based on the sum of copper sulfide and zinc sulfide, and has a particle size of 20-1000 nm, and which copper-doped zinc sulfide is not electrically conductive.

19. The copper-doped zinc sulfide according to claim 18, which is grey-green.

20. The copper-doped zinc sulfide according to claim 18, in which the copper sulfide content in the copper-doped zinc sulfide in the form of particles is homogeneously distributed over the copper-doped zinc sulfide particles or located in a layer form below the surface of the copper-doped zinc sulfide particles.

* * * * *